United States Patent [19]

Akashi et al.

[11] 4,397,911
[45] Aug. 9, 1983

[54] CLEANING TAPE

[75] Inventors: Goro Akashi; Masaaki Fujiyama, both of Odawara, Japan

[73] Assignee: Fuji Photo Film Co., Ltd., Kanagawa, Japan

[21] Appl. No.: 276,746

[22] Filed: Jun. 24, 1981

[30] Foreign Application Priority Data

Jun. 24, 1980 [JP] Japan ................................. 55-85496

[51] Int. Cl.³ ........................... B32B 5/16; G11B 5/78
[52] U.S. Cl. ................................... 428/323; 352/235; 428/327; 428/328; 428/329; 428/330; 428/331; 428/337; 428/480; 428/483; 428/900
[58] Field of Search ............... 428/327, 323, 900, 694, 428/689, 695, 698, 337, 329, 328, 330, 331, 480, 483; 352/235; 360/134; 242/195

[56] References Cited

U.S. PATENT DOCUMENTS

| | | | |
|---|---|---|---|
| 3,706,589 | 12/1972 | Fukuda | 428/327 |
| 4,010,307 | 3/1977 | Canard | 428/327 |
| 4,038,453 | 7/1977 | Loran | 428/327 |
| 4,104,436 | 8/1978 | Suzuki | 428/323 |
| 4,146,031 | 3/1979 | Fujiyama | 428/328 |

FOREIGN PATENT DOCUMENTS 49-40504  4/1974  Japan .

*Primary Examiner*—Ellis P. Robinson
*Attorney, Agent, or Firm*—Sughrue, Mion, Zinn, Macpeak and Seas

[57] ABSTRACT

Cleaning tape having a cleaning layer formed on one or both sides of a base is disclosed. Said cleaning layer is composed of (1) a binder, (2) an organic polymer powder whose particle size is $3\mu$ or more, and (3) an inorganic solid powder whose particle size is $3\mu$ or less.

10 Claims, No Drawings

CLEANING TAPE

FIELD OF THE INVENTION

This invention relates to cleaning tape for cleaning the magnetic head of a magnetic recording apparatus.

BACKGROUND OF THE INVENTION

When magnetic tape is used for an extended period of time, dust comes off the tape and builds up on the surface of the magnetic head. Dust in external environments also builds up on the magnetic head. Such buildup on the head is a cause of reduced audio and video quality which eventually results in failure to record and reproduce.

Cleaning tape is designed to remove foreign particles from the magnetic head. Cleaning tape comprising a base laminated with paper is known. See Japanese Utility Model Application (OPI) No. 55808/75 (the term "OPI" as used herein means an unexamined published Japanese patent or utility model application). But one defect of this tape it its small cleaning effect. The binder, one component of the magnetic layer, is very sticky. Therefore, once dust sticks to the magnetic head, it cannot be removed completely by rubbing with paper alone. Another defect is that paper fibers stick to the magnetic tape causing dropout.

A cleaning tape is known comprised of a cleaning layer on a base. The cleaning layer is made of the coating of a binder and hard particles 0.05 to 3μ in size. See Japanese Patent Application (OPI) No. 40504/75. This tape has great cleaning ability due to cleaning which is performed by the hard particles in the cleaning layer that abrade the buildup on the head. However, the particles tend to scratch the head. Scratches may damage the magnetic tape and reduce the tape sensitivity and S/N ratio. Since this tape uses hard particles to abrade the buildup on the head, increased cleaning effect unavoidably results in scratches on the head. It is therefore very difficult for this cleaning tape to make a compromise between fewer scratches on the head and great cleaning effect.

SUMMARY OF THE INVENTION

Therefore, one object of this invention is to provide cleaning tape having improved head cleaning ability.

Another object of the invention is to provide cleaning tape having improved wear resistance.

A further object of the invention is to provide cleaning tape having increased ability to clean the guide assembly of a magnetic recording apparatus.

A still further object of the invention is to provide cleaning tape having improved cleaning and abrading abilities.

As a result of various studies to achieve these objects, we have found that an organic polymer powder forms a soft uneven surface. Furthermore, we have found that an organic polymer powder whose particle size is 3μ or more is particularly effective for forming a soft uneven surface, and that a mixture of the organic polymer powder and a fine solid powder provides satisfactory cleaning ability. Based on this finding, we have accomplished an invention which relates to cleaning tape having a cleaning layer formed on one or both sides of a base. The cleaning layer being composed of (1) a binder, (2) an organic polymer powder whose particle size is 3μ or more, and (3) an inorganic solid powder whose particle size is 3μ or less.

DETAILED DESCRIPTION OF THE INVENTION

The term "organic polymer powder" as used herein means an organic polymer that can remain a powder in a coating. Examples of such a polymer include cellulose (e.g., KC Floc of The Kokusaku Pulp Industry Co., Ltd.), polyethylene, polyamide and polyester, which may be used alone or in combination. Another important feature of this invention is that this organic polymer powder comprises particles 3μ or more, preferably between 3 to 20μ, in size.

Examples of the inorganic solid powder used in this invention includes SiC, $Al_2O_3$, $Cr_2O_3$, $TiO_2$, ZnO, garnet and talc. The particle size of the inorganic solid powder is 3μ or less, preferably from 0.03 to 3μ, particularly preferably from 0.1 to 1μ. If the particle size of the inorganic powder exceeds 3μ, the formation of scratches on the head is appreciable and contrary to the expected effect of the inorganic powder, a low reproduction level is delivered due to the large particles. The weight ratio between the organic polymer powder and inorganic solid powder is from 1:10 to 10:1, preferably from 1:5 to 10:3.

In order to securely adhere the powders to the base, the two powders are mixed with a binder made of, for example, a vinyl chloride-vinyl acetate resin, vinylidene chloride resin, acrylic resin, methacrylic resin or a blend thereof with a thermosetting resin such as polyurethane, phenolic resin, epoxy resin or urea resin. A coating of the mixture is then applied to all or part of one or both sides of the base. The base may be made of a non-magnetic base material used in the conventional magnetic recording medium. The thickness of the base is from 5 to 25μ, preferably from 10 to 20μ. The base and binder described in Japanese Patent Application (OPI) No. 77612/78 may be used.

For the purposes of this invention, the binder, organic polymer powder and inorganic solid powder are the essential components of the cleaning layer. The cleaning layer may contain other components, such as a black dye or pigment for controlling light transmittance, and a lubricant for controlling friction coefficient.

The cleaning tape of this invention can be used as polishing tape, leader tape or trailer tape.

Some advantages of the cleaning tape of this invention are described below:

(1) it has very high cleaning ability;
(2) it does not scratch the head being cleaned;
(3) it can clean guide poles other than the magnetic head;
(4) production of desirable reproduction signals is almost complete with respect to sensitivity and S/N ratio; and
(5) the cleaning effect is only slightly reduced as a result of repeated use of the tape.

The mechanism by which the advantages of this invention are achieved can be explained as follows. The organic polymer powder such as cellulose powder provides cleaning tape with an uneven surface which removes most of the dust on the head surface. Because of the softness of the cellulose powder, the uneven surface does not damage the head surface. However, the organic polymer powder alone is not capable of producing a reproduction output level identical to the original level. According to our finding, the head surface is sometimes covered with a thin film which can effectively be removed by an inorganic powder combined with the organic polymer powder. By using this combination, a reproduction output level which is almost equal to or more than the original level can be obtained. The cleaning tape of this invention can clean not only the surface of the head but also the surface of poles in an audio or video tape recorder. It can even clean the surface of the cylinder of the video tape recorder. This cleaning prevents a reduction in picture quality caused by local demagnetization of magnetic tape due to a magnetic powder on the cylinder.

This invention is now described in greater detail by reference to the following examples which are given here for illustrative purposes only and are by no means intended to limit the scope of the invention. In the examples, all parts are by weight.

EXAMPLE 1

A polyethylene terephthalate base $15\mu$ thick was coated with a mixture of 100 parts of a cellulose powder (average particle size $=5\mu$), SiC powder (average particle size $=1\mu$), and a binder which was a blend of a vinyl chloride-acetate copolymer (vinyl chloride/vinyl acetate ratio $=7:3$, degree of polymerization $=400$) and epoxy resin, to give a dry thickness of $10\mu$. The resulting tape was slit to $\frac{1}{2}$ inch wide. Four cleaning tape samples were prepared by the above procedure but changing the amount of SiC powder as indicated in Table 1.

An evaluation of each cleaning tape sample was made by measuring the time required for it to remove dirt from the tip of the video head of a commercial home video tape recorder of VHS type. The shorter the period required for the cleaning tape to remove the dirt on the video head, the better the quality of the tape. Further, a surface of the video head to be contacted with the tape was observed with a microscope, and a reproduction output level of the video head was measured. The results are shown in Table 1.

TABLE 1

| Sample No. | Amount of Cellulose Powder (parts) | Amount of SiC (parts) | Cleaning Ability (sec) | Scratches on Head*1 | Reproduction Output Level*2 |
|---|---|---|---|---|---|
| 1 | 100 | 0 | 10 | B | −0.8 dB |
| 2 | 100 | 5 | 7 | A | 0 dB |
| 3 | 100 | 10 | 5> | A | 0 dB |

TABLE 1-continued

| Sample No. | Amount of Cellulose Powder (parts) | Amount of SiC (parts) | Cleaning Ability (sec) | Scratches on Head*1 | Reproduction Output Level*2 |
|---|---|---|---|---|---|
| 4 | 100 | 30 | 5> | A | +0.3 dB |

*1Evaluation of scratches on head
A: No scratches were observed.
B: A little scratches were observed but did not cause any problems in practical use.
C: Scratches were observed to an extent practically negligible.
*2A positive (+) output level shows that the video head reproduces a recorded signal normally and a negative (−) output level shows deterioration of the reproducing ability of the video head, in which the higher the reproduction output level of the head, the better the reproducing ability of the head.

As the table shows, Sample No. 1 using only cellulose powder as an abrasive took only 10 seconds to clean the dirt on the video head without scratching the head. But with Sample No. 1, the reproduction output level was about 0.8 dB lower than the original level. When cellulose powder was combined with SiC, the reproduction output level was equal to or 0.3 dB higher than the original level (Sample Nos. 2 to 4). Sample No. 4 took only about 5 seconds for cleaning the dirt on the video head. All samples could also remove the dirt in the guide assembly of the recorder.

EXAMPLE 2

A polyethylene terephthalate base $15\mu$ thick was coated with a mixture of 100 parts of a cellulose powder ("KC Floc W-100" of the Kokusaku Pulp Industry Co., Ltd., acicular, average length $=200\mu$, average width $=17\mu$), an inorganic powder, and a binder which was a blend of a vinyl chloride-acetate copolymer and epoxy resin (the same as used in Example 1) to give a dry thickness of $35\mu$. The resulting tape was slit to $\frac{1}{2}$ wide. Six cleaning tape samples were prepared by the above procedure while changing the type, particle size and amount of the inorganic powder as indicated in Table 2. An evaluation of each cleaning tape was made in accordance with the method used in Example 1. The results are set forth in Table 2.

TABLE 2

| Sample No. | Amount of Cellulose Powder (parts) | Inorganic Powder Type | Amount (parts) | Particle Size | Cleaning Ability (sec) | Scratches on Head | Reproduction Output Level |
|---|---|---|---|---|---|---|---|
| 5 | 100 | $Al_2O_3$ | 10 | $1\mu$ | 5> | A | 0 dB |
| 6 | 100 | $Cr_2O_3$ | 10 | $0.5\mu$ | 5> | A | −0.2 dB |
| 7 | 100 | $TiO_2$ | 30 | $0.2\mu$ | 7 | A | 0 dB |
| 8 | 100 | Talc | 15 | $3\mu$ | 5 | A | −0.1 dB |
| 9 | 100 | Garnet | 10 | $0.7\mu$ | 5 | A | 0 dB |
| 10 | 100 | ZnO | 50 | $0.2\mu$ | 8 | A | −0.2 dB |

As the table shows, $Al_2O_3$, $Cr_2O_3$, garnet, talc, $TiO_2$ and ZnO were effective as an inorganic powder for incorporation in cleaning tape, and $Al_2O_3$, $Cr_2O_3$, $TiO_2$ and garnet were particularly effective.

EXAMPLE 3

A polyethylene terephthalate base $15\mu$ thick was coated with a mixture of an organic polymer powder, $Al_2O_3$ and a binder (the same as used in Example 1) to give a dry thickness of $11\mu$. The resulting tape was slit to $\frac{1}{2}$ wide. Five cleaning tape samples were prepared by the above procedure while changing the type and particle size of the organic polymer powder. An evaluation of each cleaning tape was made in accordance with the method used in Example 1. The results are set forth in Table 3.

TABLE 3

| Sample No. | Organic Polymer Powder | Particle Size (μ) | Inorganic Powder Type | Amount (parts) | Particle Size (μ) | Cleaning Ability (sec) | Scratches on Head | Reproduction Output Level |
| --- | --- | --- | --- | --- | --- | --- | --- | --- |
| 11 | Polyethylene | 1 | $Al_2O_3$ | 10 | 1 | 30< | C | −6 dB> |
| 12 | Polyethylene | 3 | $Al_2O_3$ | 10 | 1 | 10 | A | 0 dB |
| 13 | Polyethylene | 10 | $Al_2O_3$ | 10 | 1 | 5> | A | 0 dB |
| 14 | Polyester | 2 | $Al_2O_3$ | 10 | 1 | 60 | C | −4 dB |
| 15 | Polyester | 5 | $Al_2O_3$ | 10 | 1 | 9 | A | 0 dB |

As the table shows, the larger the particle size of the organic polymer powder, the greater the cleaning effect. To be more specific, Sample No. 11 using a polyethylene powder whose particle size was 1μ had a poor cleaning ability, so the reproduction output level produced after cleaning for 30 seconds was up to 6 dB lower than the original level, and this was because dirt still remained on the surface of the video head. The same was true with Sample No. 14 using a polyester powder whose particle size was 2μ. But Sample Nos. 12, 13 and 15 using an organic polymer powder whose particle size was 3μ or more took 10 seconds or less to achieve the desired cleaning effect.

While the invention has been described in detail and with reference to specific embodiments thereof, it will be apparent to one skilled in the art that various changes and modifications can be made therein without departing from the spirit and scope thereof.

What is claimed is:

1. A cleaning tape, comprising:
   a base; and
   a cleaning layer on said base, said cleaning layer comprised of (1) a binder, (2) an organic polymer powder having a particle size of at least 3 microns, and (3) an inorganic solid powder having a particle size of no more than 3 microns, wherein the weight ratio of the organic polymer powder to the inorganic solid powder is from 1:10 to 10:1, wherein said base has a thickness of up to 25 microns, wherein said cleaning tape is an audio or video tape recorder cleaning tape.

2. A cleaning tape as claimed in claim 1, wherein said ratio is from 1:5 to 10:3.

3. A cleaning tape as claimed in claim 1, wherein said inorganic solid powder is selected from the group consisting of SiC, $Al_2O_3$, $Cr_2O_3$, $TiO_2$, ZnO, garnet and talc.

4. A cleaning tape as claimed in claim 1, wherein said inorganic solid powder has a particle size of from 0.03 to 3 microns.

5. A cleaning tape as claimed in claim 4, wherein said inorganic solid powder has a particle size of from 0.1 to 1 micron.

6. A cleaning tape as claimed in claim 1, wherein said base is from 5 to 25 microns thick.

7. A cleaning tape as claimed in claim 6, wherein said base is from 10 to 20 microns thick.

8. A cleaning tape as claimed in claim 1, wherein said organic polymer is selected from the group consisting of cellulose, polyethylene, polyamide and polyester.

9. A cleaning tape as claimed in claim 8, wherein said organic polymer has a particle size of between 3 and 20μ.

10. A cleaning tape as claimed in claim 1, wherein said cleaning tape is a video tape recorder cleaning tape.

* * * * *